United States Patent Office
3,695,849
Patented Oct. 3, 1972

3,695,849
LEACHING PROCESS
Jorge Rodriguez, Las Tranqueras 7714, Santiago, Chile
Filed Aug. 13, 1970, Ser. No. 63,556
Claims priority, application Chile, Aug. 13, 1969,
23,823
Int. Cl. B01d 11/02
U.S. Cl. 23—270                    6 Claims

ABSTRACT OF THE DISCLOSURE

To wash leaching residues, they are placed in a tower through which washing fluid is directed. Vertical and perhaps horizontal elements are placed in the tower to control flow of the washing fluid through the residues.

BACKGROUND

Field of invention

This invention relates to apparatus for leaching processes.

Prior art

In leaching processes, the rich solution is generally extracted, after a prior settling step over the top of the residue or else it is drained through a double filtering bottom. Certain materials must be leached in six to eight large or medium sized deposits which are worked in series.

The residue that is left in these leaching vats, although it no longer contains in a solid state any of the substance that is desired, is soaked in rich solution. This residue is then washed with three, four or more liquids of decreasing concentration and, even then, is thrown away with a certain richness which is lost. This loss is in the impregnating liquid.

Each washing liquid must be stored in a tank (the Guggenheim process for saltpeter uses eight tanks) and its volume is generally much larger than what the container which is full of material to be washed will hold. Therefore, during this operation, the washing liquid has to be poured through the double bottom in order to enable emptying by the top without flooding it. For this reason, some washings last fourteen hours. Added to this is the practice of draining for at least twelve hours to reduce humidity to a minimum before changing to another washing liquid of lower concentration.

SUMMARY OF INVENTION

It is an object of the invention to simplify washing and to provide for doing it in one continuous operation and in one apparatus whereby there are obtained the advantages of saving time and containers as well as piping, valves, pumps and the tanks used for washing liquids.

According to the invention, the leaching vat can be much smaller and simpler because it will not be necessary to effect in it the difficult and time consuming washing of the residue. Generally, one deposit will replace the conventional six or more that work in series.

In leaching which is done with Dorr thickener, which also works in a series of from three to five and with various additional tanks for the washing liquids, these Dorr thickeners and the washing tanks may be replaced by a single thickener and the washing apparatus is positioned closer to the lower central part.

DETAILED DESCRIPTION

Figure 1:
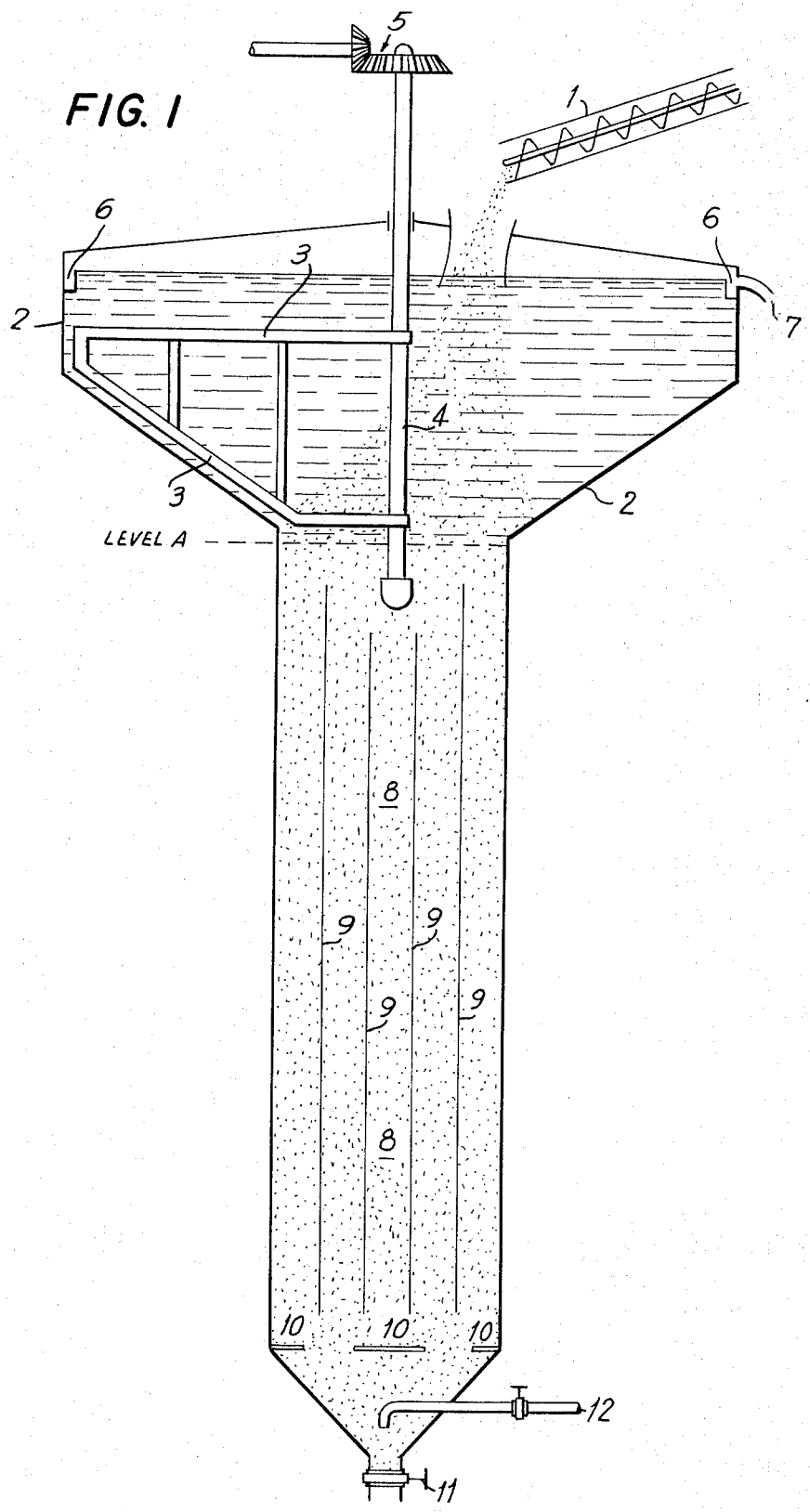
FIG. 1 diagrammatically illustrates residue washing apparatus provided in accordance with the invention.

In FIG. 1, screw feeder 1 intermittently empties the leaching residue into the washing apparatus. Cylindrical deposit member 2, similar to a thickener, has a slightly conical base. The diameter must be in agreement with the speed of sedimentation of the solution impregnating the residue. If the solvent is volatile or if it is hot, the deposit must be hermetic (as it is in FIG. 1) with a hydraulic closure for the entry of the material to be treated. In the opposite case, it is preferred to eliminate the upper lid for greater simplicity.

Rake 3 takes the slime to the center. One revolution per minute or every two minutes is suitable for the rake. Shaft 4 of the rake is supported from below in a bracket fastened to the deposit member 8.

There is a system 5 of gears to move the rake which can also be moved by chain. An overflow 6 is provided for the deposit member 2 around its entire periphery. Drainpipe 7 is provided for the impregnating solution. Washing tower 8 is of cylindrical or rectangular section. ⅛" x 6" bands 9, made of steel, hang down from the top to the bottom of the tower 8. These augment the freeways for the rising washing solutions.

For an even discharge of the processed material, preventing its descent mainly through the center, screens 10 are placed horizontally and level with the conical bottom of member 8. A ring is firmly attached to the perimeter of the interior wall of the deposit member and a central disc is also attached to the same wall. This allows material to descend more evenly when going through the annular space left between the screens.

A processed-mineral outlet 11 is provided with a valve to open or shut this outlet. It may, for example, be a 4" by-pass valve, a "pitch-valve," or any similar valve. Washing-liquid inlet 12 has a pump of adjustable flow.

Figure 2:
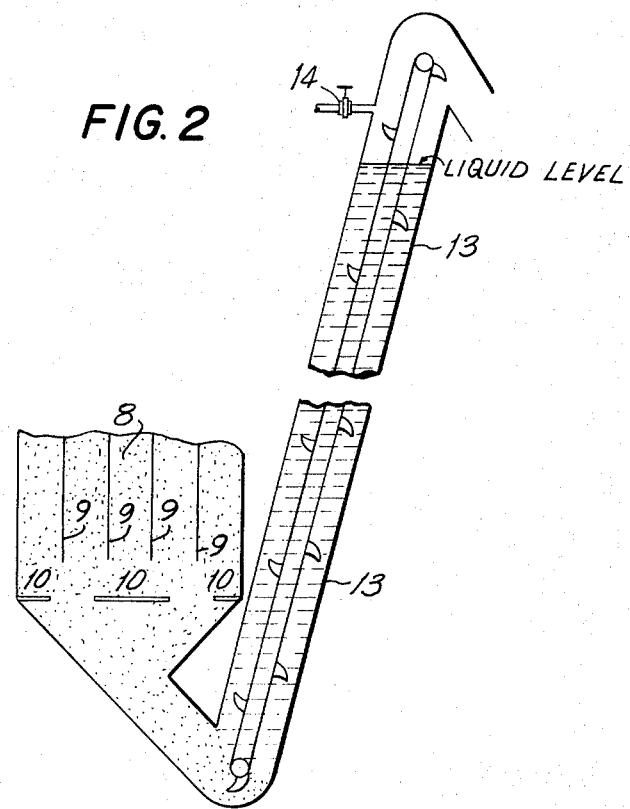
FIG. 2 shows a modification of FIG. 1.

In FIG. 2 is shown the lower part of the deposit member 8 where, instead of a valve to extract the washed residue, a Canguilones elevating apparatus 13 is used that works continuously or intermittently. This must be located inside a hermetically sealed box and the drainpipe must be substantially higher than the level of the outlet 7 in FIG. 1.

The washing liquid is introduced via valve 14 by means of an adjustable pump. This liquid is maintained so as to practically fill the pipe 13 and thus serves to finish the washing of a difficult-to-treat residue that ascends in the Canguilones apparatus 13 flooding the washing liquid.

As to operation of the above apparatus, the washing tower 8 is filled up to one meter below level A with treated or inert (sand) material. Then, by means of the feeder screw 1, the leaching residue is inserted to be washed, filling member 8 to level A. An automatic control detains the feeder 1 when this level is reached, the feeder 1 being put once again into action if the level descends.

This is the time of the first discharge by valve 11. The amount of these discharges and the time between them is determined by practice. Normally, 3% of the capacity of the tower and every six minutes is convenient.

During the entire process, an adjustable pump must inject in six minutes the washing liquid necessary to replace that which impregnates the washed residue which comes out via outlet 11.

After each discharge via outlet 11, the feeder screw refills the tower 8 to level A with leached material impregnated with a rich solution. This material falls on top of that which is in the tower 8 already flooded with liquid, which makes this rich solution move upwards. If this incoming material has a 20% humidity, for each dry base tonnage, 250 liters of rich solution would rise to the deposit member 2, finally filling it and starting to pour into pipe 7.

The liquid that rises in tower 8, at the height of level A, has acquired a concentration similar to the rich impregnating solution that is entering by feeder screw 1, having met the material that was descending in tower 8.

The process is easy to manage. When the liters of rich impregnating solution have come out, corresponding to the residue to be washed that the screw 1 introduces between each discharge, outlet 11 opens automatically and empties the 3% of the capacity of the tower and shuts again. The material that enters by screw 1 is strictly related to that which comes out by outlet 11. It is sufficient to measure the latter to know how much has entered.

In many leaching processes, the solutions must be made only with heated loaded liquids and must not introduce more liquids than these. However, it is evident that if there is evaporation, it might be convenient to introduce by inlet 12, fifty or more liters of washing liquid per processed ton to make a more perfect draining.

When a hundred liters per dry base ton are passed, the rich solution coming out by pipe 7 has 100 grams per liter and the liquid impregnating the residue comes out by outlet 11 with less than 1 gram. This makes a wash of more than 100 to 1. When the crystalization is done out-of-doors, there is generally sufficient evaporation to pass fifty or more liters per ton. The case of the leaching of edible oils is very favorable, because all the solvent may be introduced by inlet 12, thereby obtaining a nearly perfect wash.

Something similar occurs in the ammoniacal leaching of copper, where all the water may also be introduced by inlet 12, adding the ammonia later in the process. Obtaining solutions with 6% of ammoniacal copper, a mineral of 2% may be washed passing 333 liters of water and one of 4% with double this quantity.

The capacity of treatment of this apparatus is measured by the cross-section of the washer 8. One square meter of cross-section is capable of washing more than 70 tons daily of a mineral of 1.6 apparent density. This is a nearly constant average, which augments or diminishes in direct relation to the density.

Washing is done in this procedure because the washing liquid entering below is constantly rising through the apparatus. This liquid enriches its concentration as it rises. On the contrary, the material that is washed descends and meets steadily weaker solutions until it is discharged at the bottom and impregnated with the liquid that is just entering the process.

The washing of a material from the bottom upwards presents two difficulties:

(1) The denser solutions near the top tend eventually to shift downwards, where the less dense ones are;

(2) The washing liquid rises at times preferably by the walls of the deposit member where the washing is being carried out, seeking the easy paths, especially when it rises too slowly.

In the apparatus described in FIG. 1, the first of these difficulties is avoided, the thick material being processed along with the fine. This fine material, especially if it contains clay, impedes the descent of the denser solution, by the pressure and frequent contact produced by the material being processed.

For this, the washing tower must have a convenient height (in some cases six meters or more) and thus solutions with 1.1 density from below are separated from solutions of 1.2 from above by 1 or 1½ meters of sufficiently fine material, that by contact or water tightness does not permit them to mix or the denser one to descend.

It may be that the material to be processed is too thick. In that case, it must be mixed with fine sand before it is put in the washer. The fine material is recuperated by sieving the residue before throwing it away, thus enabling to use it again. The washing capacity of the apparatus is not decreased as the fine material only fills the spaces between the thick material.

The second inconvenience (that the washing liquids ascend looking for the easy paths close to the walls of the deposit member) is solved by enlarging these freeways instead of avoiding them.

Using different devices, it is possible to obtain that the rising currents remain very close to each other and that by horizontal dilution, by the tendency of solutions to homogenize the washing of material that descends towards steadily weaker liquids is produced.

The necessity to make this apparatus tall and with devices to establish free-ways close to each other is therefore understood to produce a good horizontal dilution.

The apparatus may have considerable section (5 sq. mtrs. or more) as long as its height is convenient and so that the smooth walls can be made with concentric tubes, vertical bars, bands, etc., close to each other, perhaps at 0.30 meters.

It is sometimes advantageous to install narrow crossbars, horizontal or with a slight inclination, to establish free-ways. A triangular space empty of material remains under the bars which helps the horizontal dilution.

Generally, the liquids rising to wash a considerable mass of material, are not of a great cubic measure perhour and they slide by the free-ways and not through the material to be processed; and in this way only a small percentage of the slime that the material may contain will reach the higher deposit member 2.

In FIG. 3 are represented six different devices to augment the free-ways for the ascent of the washing liquid. In FIG. 3 (a), (b), (c) and (e) the apparatus is a cylindrical tube. In FIG. 3(a), the apparatus has in its interior hermetic tubes closed at both ends, around whose walls the washing liquid rises, as well as close to the walls of the washing apparatus. In FIG. 3(b), the same effect is caused by some bars made of iron, wood, etc. or strings, chains or other analogous elements, placed close to each other. These elements may have small thin bars soldered or attached hroizontally to them to undo nodules that may be formed in the material being processed, which, as it descends, would be broken on these thin bars. The devices placed vertically may also have a slight swinging movement from top to bottom which must be slow and spaced at two or three minutes.

Figure 3A:
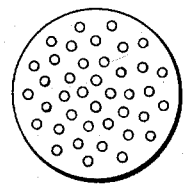
FIGS. 3(a)–(g) show elements arranged in the tower of FIG. 1 according to different embodiments.
Figure 3B:
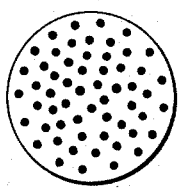
Figure 3C:
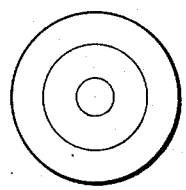

In FIG. 3(c), the same effect of having the free-ways close to each other is obtained with tubes concentric to the walls of the washer; it is convenient that these tubes have perforations that permit the solutions to interchange.

Figure 3D:
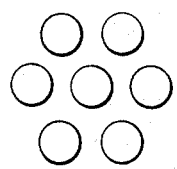
Figure 3E:
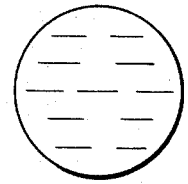

In FIG. 3(e), smooth or corrugated metal bands or strips or mesh of spread-out metal, etc., are used.

Figure 3F:
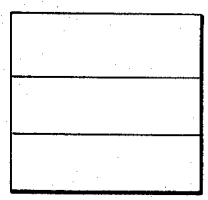

In FIG. 3(f), the apparatus has a rectangular shape, with longitudinal interior partitions placed 0.30 or 0.40 meters apart and perforated for the interchange of the solutions.

All these devices explained previously must reach only to the beginning of the base cone of the apparatus, where the extracting mechanism is located and the washing liquid enters.

In FIG. 3(d), the cylindrical shape of the washer is replaced by numerous tubes 0.20 to 0.40 meters in diameter.

The lower part of these is hermetically joined to a cone shared with the valve for discharging the residue. Within these tubes, the liquids rise by the walls and remain a short distance from the center of them, thus making for a good wash.

Horizontal or slightly inclined bars of a width of 1" or more may also be placed within the washing apparatus.

Figure 3G:
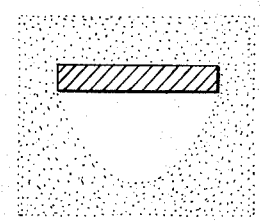

In FIG. 3(g), the space free of material that remains under these bars and facilitates the horizontal dilution may be observed.

This process of washing has the following advantages:
(1) Simple apparatus.
(2) Easy process handling.
(3) This process uses percolation from bottom to top which permits clay-like materials and fines of difficult permeability to be treated.
(4) Economy of installation and washing time due to its being done in a continuous manner, without long hours of waiting for liquid drainage and hours of percolation from top to bottom being necessary for each of the numerous washings with different liquids.
(5) There are no tanks for washing liquids of different concentrations.
(6) The movement to which the material is subject, because of the periodic and successive discharges of residue, impedes the formation of cracks which would be freeways for the liquids and would leave parts of the material unwashed, as occurs in the usual methods of leaching. This also permits a better drainage.
(7) The high shape of the apparatus (small horizontal section) allows better washing which, because it is a continuous and progressive system, is equivalent to washing with innumerable liquids and perpetually decreasing density.
(8) When working with hot solutions, this apparatus completely recuperates the heat, because washing liquids rise within the apparatus countercurrent with the descending hot material. In this procedure, the washing liquids do not go to tanks to cool off while waiting to be used again.
(9) Much saving, within the plant, of manpower and loading machinery and of unloading and transportation of material to be processed or already washed.

What is claimed is:
1. Apparatus for washing leaching residues comprising a tower having an upwardly outwardly extending top portion, an elongated substantially vertical middle portion, and a downwardly extending bottom portion, means for introducing the residues into the top portion of the tower, means for releasing processed residues from the bottom portion of the tower, means for introducing washing liquid into the bottom portion of the tower, means for discharging enriched washing liquid at the top portion of the tower, a rotating rake in said top portion of said tower to displace the residues into said middle portion, and elongated baffle means vertically disposed in the middle portion of said tower to form a plurality of elongated parallel vertical paths therein to improve extraction from said residues by controlling flow of the washing liquid therethrough, means also including horizontal screens disposed in said tower below selected of said paths at a level between the middle and bottom portions of the tower to allow material to descend more evenly along the paths.

2. Apparatus as claimed in claim 1 wherein said elongated baffle means are perforated walls.

3. Apparatus as claimed in claim 1 wherein said elongated baffle means are tubes.

4. Apparatus as claimed in claim 1 wherein said elongated baffle means are rods.

5. Apparatus as claimed in claim 1 wherein the tower and elongated baffle means are cylindrical.

6. Apparatus as claimed in claim 1 wherein the elongated baffle means are corrugated or smooth sheets.

References Cited

UNITED STATES PATENTS

| | | | |
|---|---|---|---|
| 3,539,539 | 11/1970 | Goetzke | 23—270 |
| 3,585,005 | 6/1971 | Coggan | 23—270.5 |
| 2,740,697 | 4/1956 | McKay | 23—270.5 |
| 3,190,729 | 6/1965 | Emmett | 23—270 R |
| 2,213,798 | 9/1940 | Arrne | 23—270.5 |
| 3,390,402 | 6/1968 | Goerg | 23—270 R |
| 2,132,151 | 10/1938 | Fenske | 23—270.5 |
| 2,258,982 | 10/1941 | Gordon | 23—270.5 |
| 2,681,269 | 6/1954 | Bergstrom | 23—270.5 |
| 2,874,199 | 2/1959 | Tarr | 23—273 |
| 3,033,541 | 5/1962 | Belkin | 23—270.5 |

FOREIGN PATENTS

| | | | |
|---|---|---|---|
| 817,905 | 8/1951 | Germany | 23—270 R |
| 403,252 | 9/1924 | Germany | 23—270 R |

NORMAN YUDKOFF, Primary Examiner

S. J. EMERY, Assistant Examiner

U.S. Cl. X.R.

23—310